No. 658,687. Patented Sept. 25, 1900.
J. M. SWIFT.
FIRE ESCAPE.
(Application filed Apr. 12, 1900.)

(No Model.)

Witnesses:

Inventor
J. M. Swift
by H. R. Willson & Co.
Attorneys

THE NORRIS PETERS CO., PHOTO-LITHO., WASHINGTON, D. C.

UNITED STATES PATENT OFFICE.

JESSE MONROE SWIFT, OF SELMA, CALIFORNIA.

FIRE-ESCAPE.

SPECIFICATION forming part of Letters Patent No. 658,687, dated September 25, 1900.

Application filed April 12, 1900. Serial No. 12,559. (No model.)

*To all whom it may concern:*

Be it known that I, JESSE MONROE SWIFT, a citizen of the United States, residing at Selma, in the county of Fresno and State of California, have invented certain new and useful Improvements in Fire-Escapes; and I do declare the following to be a full, clear, and exact description of the invention, such as will enable others skilled in the art to which it appertains to make and use the same.

My invention relates to fire-escapes, and has for its object to provide a substantial bridge-like structure connecting two buildings, whereby the occupants of a burning building may safely cross over to the other building or place of safety.

Further objects are to provide a fire-escape of this character which shall be strong, light, and durable and which can be cheaply constructed and erected and of different sizes and lengths to suit various demands.

With these ends in view the invention consists in certain features of construction and combination of parts, as will be hereinafter described, and pointed out in the claim.

Figure 1:
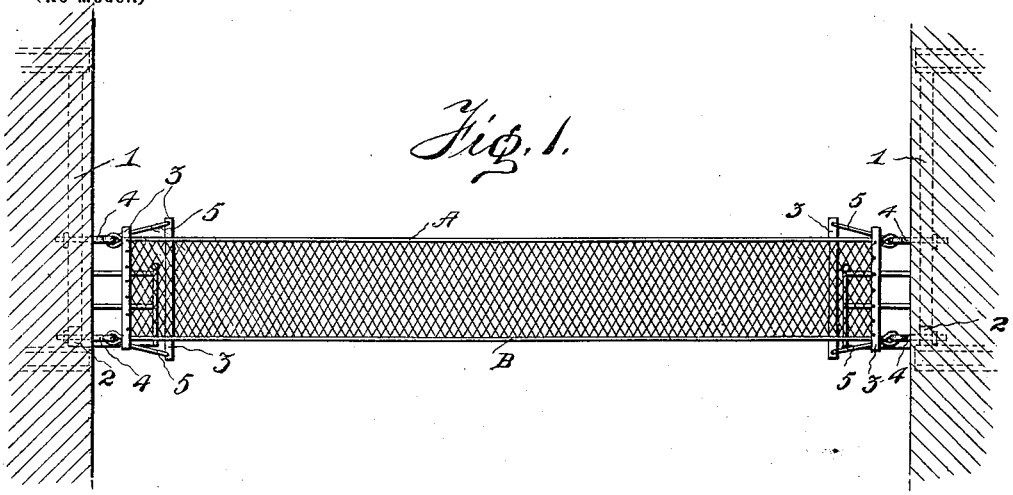
Figure 2:
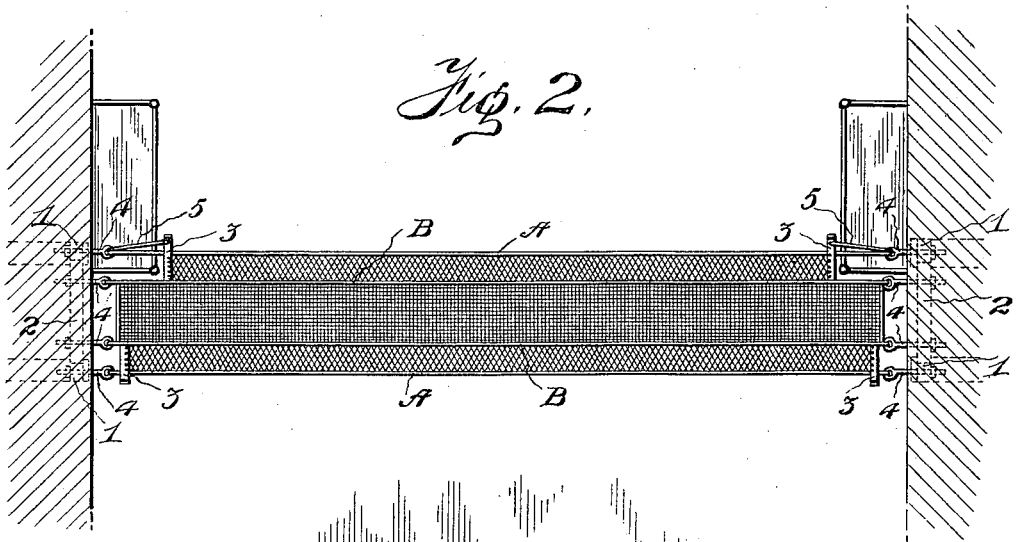
Figure 3:
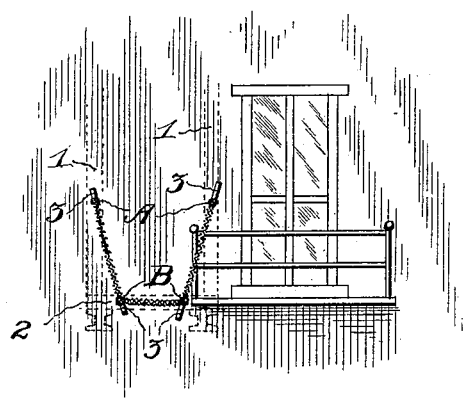

In the accompanying drawings, Figure 1 is a side elevation of the fire-escape, showing it connecting two buildings. Fig. 2 is a top plan view of the same, and Fig. 3 is a vertical transverse sectional view through the same.

In constructing my fire-escape I stretch four wire cables A A B B, of sufficient size and strength for the purpose, between the buildings located upon opposite sides of the street, as shown, the two lower cables B B being on the same horizontal level and being connected together along their entire length by a network of woven wire, thus forming a floor over which occupants of a burning building may pass to a place of safety. At a higher level I stretch the other two cables A A, and on each side between cables A B, I provide a wire network extending along their entire length, thus forming the side walls of my fire-escape.

In the walls of the buildings I place the vertical anchor-posts 1, connected at their upper and lower ends to the floor-girders of the building, thus bringing the strain upon the whole structure and not at any particular point. I connect the lower ends of the vertical anchor-posts with a sill 2.

3 denotes oblique or slanting bars provided at each end of the side sloping walls and to which is attached the wire network forming said sides. The anchor-posts 1 and sills 2 are each provided with eyebolts 4, to which are attached the ends of the cables A A B B of the fire escape.

The bars 3, to which the network sides are attached, may be provided with short cables 5, which also engage the eyebolts 4 in the anchor-posts 1 and sills 2, the eyebolts being provided upon their inner ends with nuts, whereby they may be adjusted and the cables stretched when necessary.

The fire-escape is preferably, though not necessarily, placed at one end of a balcony, as shown in the drawings. When such is the case, the wire-network sides may be made shorter to provide a passage from said balcony to the escape, and the short cables 5 are used to connect the end bars 3 with the anchor-posts and sill. It is obvious, however, that I may apply my device in front of a window or door in the walls of buildings. I also preferably construct my fire-escape narrower at the bottom than at the top, thereby causing it to be self-bracing and materially lessening vibration.

A fire-escape as herein described is capable of being readily applied to buildings now erected or to be built in the same during erection.

Various changes in the form, proportion, and the minor details of construction may be resorted to without departing from the principle or sacrificing any of the advantages of my invention.

Having thus fully described my invention, what I claim, and desire to secure by Letters Patent, is—

A fire-escape, comprising a bridge adapted to connect adjoining buildings and constructed of upper and lower pairs of cables, a network connecting the lower set of cables to each other and to the upper set of cables to form a flooring and side walls, bars arranged at the ends of the bridge alongside said side walls, anchor-posts adapted to be fixed in the walls of the building, sills to which the lower ends of the posts are connected, and
5 means adjustably connecting the cables and the bars with said posts and sills, substantially as set forth.

In testimony whereof I have hereunto set my hand in presence of two subscribing witnesses.

JESSE MONROE SWIFT.

Witnesses:
  J. B. ESTES,
  D. S. ORR.